United States Patent [19]
Sternbeck

[11] 4,128,741
[45] Dec. 5, 1978

[54] ELECTRONIC CROSSPOINT ARRAY
[75] Inventor: Olaf Sternbeck, Bromma, Sweden
[73] Assignee: Telefonaktiebolaget L M Ericsson, Stockholm, Sweden
[21] Appl. No.: 845,279
[22] Filed: Oct. 25, 1977
[30] Foreign Application Priority Data
Nov. 2, 1976 [SE] Sweden .................... 7612207
[51] Int. Cl.² ............................. H04Q 1/52
[52] U.S. Cl. ........................ 179/18 GF; 357/45
[58] Field of Search .............. 307/43, 303, 317 A; 357/45, 46; 179/18 GF

[56] References Cited
U.S. PATENT DOCUMENTS

| | | |
|---|---|---|
| 3,692,949 | 9/1972 | Jovic .................... 179/18 GF |
| 3,913,213 | 10/1975 | Mills et al. .............. 357/46 |
| 3,922,565 | 11/1975 | Berger et al. ............ 357/46 |
| 3,995,307 | 11/1976 | Alcorn et al. ............ 357/46 |

*Primary Examiner*—Thomas A. Robinson
*Attorney, Agent, or Firm*—Hane, Roberts, Spiecens & Cohen

[57] ABSTRACT

A cross-point array for telecommunication systems, produced as an *xy*-matrix in a monolithic substrate with switching means arranged at the cross-points between the *x* and *y* conductors in the form of transistors controllable to assume an "on" state with a low impedance and an "off" state with a high impedance, the transistors having their collector-emitter path connected between the *x* and *y* conductors and supplied with current from a constant-current generator, is improved by having the collector-base diode of each transistor connected in parallel with a Schottky-diode supplied with current from a second constant-current generator and operating in its forward direction in the "on" state, whereby cross-talk caused by a parasitic transistor function is inhibited between the cross-points in the substrate.

4 Claims, 4 Drawing Figures

ELECTRONIC CROSSPOINT ARRAY

BACKGROUND OF THE INVENTION

The present invention relates to an improved electronic cross-point array for telecommunication systems wherein the array is an $xy$ matrix with semiconductor switches arranged at cross-points between $x$ and $y$ conductors that are connectable to each other by bringing the switches to an "on" state.

Cross-point arrays are in principle known previously, see e.g., the British Pat. No. 1,199,199, FIGS. 1 and 3. According to this British patent, transistors are used as switches. These transistors are in a known manner caused to assume a conducting state in and for the mentioned "on" state, while for the "off" position they are caused to assume a non-conducting state. However, the stated patent does not indicate that transistors do not have completely satisfactory properties owing to the fact that the ratio between the respective resistance-values in the "on" and "off" states is not sufficiently high, nor is the isolation between the required control circuit and the switch circuit sufficiently good.

The stated patent suggests the use of a field-effect transistor in a so called MOS structure. In view of the desire to manufacture the electronic cross-point arrays as an integrated circuit in a monolithic embodiment, i.e., with a considerable number of switches formed on one and the same semiconducting substrate, the indicated solution is not satisfactory.

What is desired is an electronic cross-point array or matrix consisting of a fully integrated monolithic circuit that can be made by the transistor manufacturing processes now in common use. For devices that include npn-transistors these processes start out from a substrate of p-doped medium-resistive silicon in the form of a mono-crystal. During the circuit manufacturing process first the $n^+$-doped so called sub-collector electrode is formed for each separate transistor, and subsequently a thin homogeneous n-doped epitaxial layer is applied to cover the entire sub-collector side of the substrate. The base and the emitter electrodes of each npn-transistor are subsequently diffused as p- and $n^+$-doped electrodes, resectively, into the epitaxial layer above the respective sub-collector. Around each transistor there usually is a p-doped isolation frame which is extended through the epitaxial layer to contact the substrate.

During the operation of the circuit, all three transistor electrodes must continuously by kept first and foremost at a positive voltage relative to the substrate. If the electronic cross-point array or matrix is based on transistors of the above-mentioned type used as switches, there has proved to be great difficulties in maintaining a high degree of isolation between the transistors and the substrate in general and between the substrate and the collector of the individual transistor in particular.

BRIEF DESCRIPTION OF THE INVENTION

An object of the present invention is to provide a matrix of transistors for an electronic cross-point array that eliminates the above-mentioned disadvantage as well as other disadvantages, and that obtains further advantages, e.g., a high ratio between the resistance of the switch in its "off" and "on" state, a low attenuation with respect to the telecommunication signals transmitted by the switch and an increased speed with respect to the transition of the switch between its both operating states.

These advantages are obtained by connecting a Schottky-diode (i.e., a diode provided by a transition between a metal and a semiconductor) between the collector and the base of the transistor that is used as a switch.

The characteristics of the invention appear from the appended claims.

BRIEF DESCRIPTION OF THE DRAWING

In order that the invention will be better understood, it will be described more in detail below, with reference to the accompanying drawing where:

FIG. 1 shows a circuit diagram of a cross-point between a first $x$ conductor and a first $y$ conductor and a cross-point between a second $x$ conductor and a second $y$ conductor. Before this circuit diagram is described in detail, the case of the single transistor will be treated with reference made to FIG. 2.

For the single transistor, FIG. 2 shows the collector current $I_C$ depicted as the ordinate. For two different base currents $I_{B1}$ and $I_{B2}$, it is a function of a voltage $U_{CE}$ measured between the collector and emitter and depicted as abscissa. From the diagram it is apparent that the collector current starts at zero for a collector voltage which is zero and that for a rising voltage $U_{CE}$ collector current $I_C$ subsequently rises principally in a linear direction up to a "knee" and thereafter considerably slower than in the initial region. The position of the knee is to a certain degree affected by the value of the base current $I_B$, which explicitly is evident from FIG. 2, for two different base currents, $I_{B1}$ and $I_{B2}$, where $I_{B2} > I_{B1}$. When using the transistor as a switch element it is, in order to obtain a low degree of dynamic switch-impedance, desired to work within the indicated initial region, e.g., in the A-designated point in FIG. 2, which has been shown to be located approximately in the middle of the initial region, with a low value of voltage $U_{CE}$. However, there is a serious disadvantage due to the following circumstance. Between the main transistor and the substrate there exists a second conditionally conductive transistor structure which normally is called the parasitic vertical pnp-transistor (if the main transistor is formed as an npn-transistor). The parasitic transistor functions with the base and the collector of the main transistor as the emitter and base respectively and with the substrate as collector. The parasitic transistor is in and by itself an inevitable consequence when the structure employed for the main transistor includes an epitaxial layer applied on the substrate. The parasitic transistor usually has a relatively low current-gain factor due to its unfavorable geometry and can therefore scarcely be employed as a circuit element in the integrated circuit. Instead, it constitutes a substantial disadvantage as a result of the operating current that is obtained in the substrate through the parasitic transistor's gain factor and an active injection from the main transistor's base-collector region to the collector-substrate region.

Figure 2:
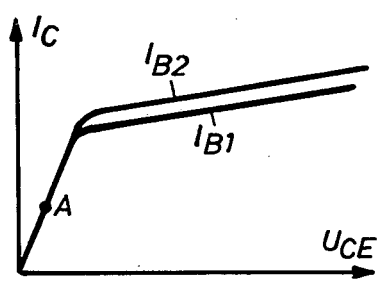
FIG. 2 is a diagram showing the relationship that a transistor exibits between the collector current $I_C$ and the voltage $U_{CE}$ between the collector and the emitter with the base current $I_B$ the variable parameter.

Subsequently, when the main transistor that constitutes the switch in the cross-point is operated in a manner shown in FIG. 2 at the operating point A, i.e., within the collector-current's initial region where the collector-resistance is very low, there is through the parasitic transistor obtained a disturbing substrate current, which in respect to the magnitude is somewhat smaller than the main transistor's base current and depends on the parasitic transistor's current-gain factor.

The disturbing substrate current is strongly dependent on a collector-emitter voltage $U_{CE}$, and therefor it becomes difficult to realize by means of the main transistor the switches with a desirable linearity and low attenuation, which should be less than 0.1 dB.

In accordance with the present invention, the difficulties are eliminated by connecting between the main transistor's base and collector an impedance element that has a low resistance and conducts an electric current in exclusively one direction and has a low threshold voltage of the order of magnitude of 0.3–0.4 volts. If the main transistor is made in the form of an integrated element on a monolithic silicon substrate, the supplementary element can not however be realized as an, in a conventional manner, contacted pn-transition but must be made as a Schottky-diode.

Figure 3:
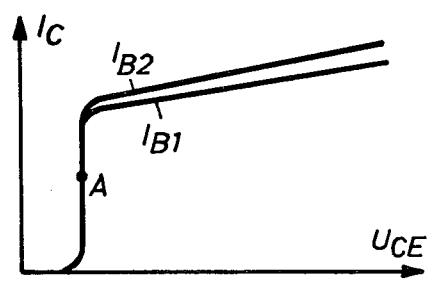
FIG. 3 is a diagram of the same type as the one in FIG. 2 but for such a combination of a transistor and a Schottky-diode that is employed in accordance with the invention.

FIG. 3 shows what happens when a Schottky-diode is connected in shunt with the main transistor's base-collector path. As in FIG. 2, FIG. 3 shows the collector current $I_C$ as a function of a collector-emitter voltage $U_{CE}$, with two different values on the base current and with the corresponding curves denoted $I_{B1}$ and $I_{B2}$. It is to be noted that such a displacement has been obtained of the previously discussed initial region that its linear part is moved towards somewhat higher values of voltage $U_{CE}$ and that a considerably increased transconductance is obtained, which implies that the collector-resistance is lower and, subsequently, the attenuation will be very low. Of the following description of the junction shown in FIG. 1, it will be clarified that the indicated advantage requires certain circuit design measures in order that it will occur in the proper way.

Figure 1:
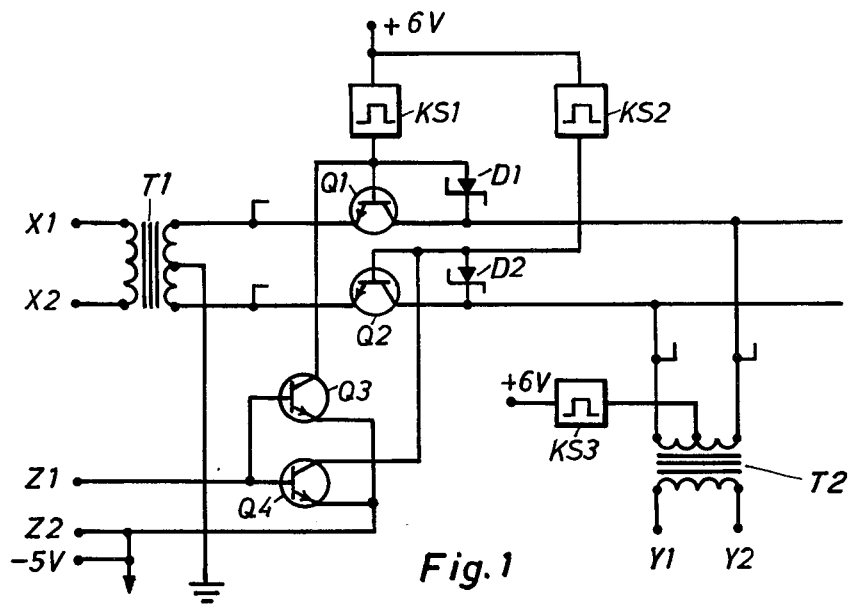
FIG. 1 shows an embodiment of the invention with a switch at the cross-points between a pair of $x$ conductors for an incoming two-wire telecommunication cable and a pair of $y$ conductors for an outgoing cable.

The following refers to FIG. 1, which shows the circuit of a double cross-point for a two-wire electronic cross-point array for a telecommunication system. For the sake of completeness it should be indicated that in principle it is possible to form single-wire cross-point arrays, thus with only one cross-point for one connection, but in practice two-wire connections are always used. Only the two semiconductor elements used for one connection in the cross-point array or matrix are shown, and these elements are included in the matrix as intregated npn-transistors with a sub-collector and a p-substrate in the matrix that is arranged to comprise a considerable number of cross-points.

In FIG. 1, a conductor-pair (not shown) from the outside is linked to the connections X1 and X2 of a transformer T1 and a second conductor-pair (not shown) from the outside is linked to the points Y1 and Y2 on a second transformer T2. The conductor-pairs are connectable with each other through the above-mentioned cross-point circuit in order to provide a transfer of speech-current.

The transformer T1 is in the usual way formed with a secondary winding having a grounded mid-point connection, and outer connections connected to the emitter-electrodes in transistors arranged for all the x wires in the matrix. Since all these transistors are formed and connected in the same way, the detailed description is initially restricted to a transistor Q1 arranged for a first x wire. As already has been mentioned, the transformer T1 is connected to the emitter of transistor Q1 and the collector of transistor Q1 is through the x wire and via an end part of the secondary winding connected to a mid-point connection of a secondary winding of a transformer T2 pertaining to the conductor-pair connected to points Y1 and Y2. The secondary winding of transformer T2 is in the usual way connected with additional x wires. The collector of transistor Q1 is supplied with current through the secondary winding of transformer T2 from a constant-current generator KS3 that in turn is energized from a voltage source, which in the shown case is denoted +6V but of course is not limited to this voltage value.

The base in of transistor Q1 is connected to a voltage source which has been denoted +6V but of course can have another suitable voltage, and the emitter-current is obtained through a constant-current generator KS1. For the purpose of controlling the base in of transistor Q1 for a transition between "on" and "off" states, the base is further connected to the collector in an additional control transistor Q3, whose base is connected to a terminal Z1. The emitter of transistor Q3 is connected to a terminal Z2. By applying a suitable voltage between terminals Z1 and Z2 the transistor Q3 assumes conductive or non-conductive states. The terminal Z2 is kept at a voltage of, e.g., −5V in order to keep the substrate of the matrice at this voltage.

What is characteristic about the invention is that between the base and the collector-electrodes of the transistor Q1 there has been connected a Schottky-diode $D_1$, which in the shown case with a main transistor Q1 of npn-type has its anode connected to the base of transistor Q1 and its cathode connected to the collector of the transistor Q1.

For the second x wire there is a corresponding connection with a transistor Q2, a Schottky-diode D2, a constant current generator KS2 and a control-transistor Q4. For this arrangement, a common use is made of the constant current KS3 and the control terminals Z1 and Z2.

The constant current generators KS1, KS2 and KS3 are to be regarded as contributing to those advantages which are obtained through the invention, Their function will be evident from the following description of the operation of the cross-point.

Figure 4:
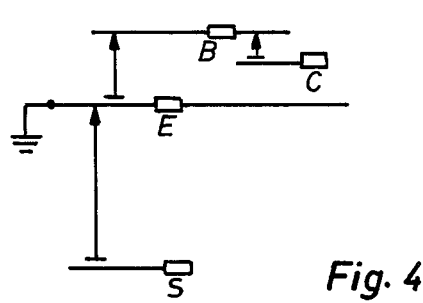
FIG. 4 shows the operating conditions for a switch according to the invention in its "on" state and its "off" state respectively.
Figure 4:
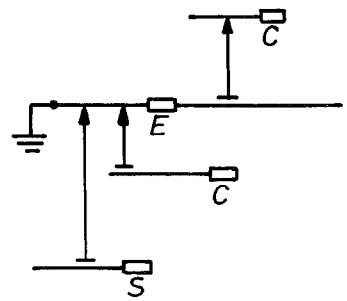

It should be noted that the transistors Q1 and Q2 have normal base and emitter electrodes which give the diode-voltage drops of approximately 0.7 volts in the forward direction and that the Schottky-diodes D1 and D2 have voltage drops of approximately 0.4V in the forward direction. When the transistor Q1 is brought to its conducting state—the "on" state—through a suitable control-voltage between the connections Z1 and Z2, such an operating current (in a typical case of the order of 100 µA) has been obtained through the dimensioning of the constant current generator KS1, that the transistor works within the mentioned initial region of the $I_C$–$U_{CE}$ characteristic shown in FIGS. 2 and 3, at a low $U_{CE}$ and thus in the beginning of the linear region. The collector-base voltage $U_{CB}$ of the transistor Q1 amounts to approximately 0.3 volts and the transistor functions as an active amplifier of the base current and the polarity is such, that the Schottky-diode D1 that is connected in parallel with the base-collector path is biased forwardly. Simultaneously, the base-emitter voltage of the transistor Q1 is approximately 0.7 volts and this pn-transition path is biased in the forward direction. The total voltage drop inside of the transistor Q1 is thus low in this "on" state of switch with the transistor Q1 in a conducting state. It is of an order of magnitude of 0.3 volts for the longitudinal cross-current inside of the switch, i.e., the current to the substrate S is extremely low. The pnp-parasitic transistor that is created as an integrated element through the structure of the main transistor and that consists of the main substrate and the main transistor's base and collector is subsequently inhibited to function due to the potential distribution of the switch as shown on the left side of FIG. 4 for the "on" state. There the distances in the vertical direction between respective electrodes indicate voltages for which above the grounded line above are positive and below the same line are negative in relation to the ground. The notations used in FIG. 4 are the usual, namely B for base, C for collector, E for emitter, and S for substrate.

When the control-voltage between Z1 and Z2 provides, by means of the transistor Q3, that the base in the transistor Q1 becomes negative in relation to the emitter, and that thus the base-emitter transition is working in a reverse direction, the base-collector transition and the Schottky-diode will also be working in the reverse direction and the current between the transformer T1 and the transformer T2 through the transistor Q1 will be zero and the cross-current will remain very low. In the "off" state it is apparent that the collector of transistor Q1 will obtain a high voltage in relation to ground, and that this voltage is equal to the constant current generator's KS3 open-circuit voltage. The potential distribution in the "off" state are shown in the right hand side of FIG. 4.

In the "off" state the control transistor Q3 has a low dynamic resistance between the collector and the emitter and will short-circuit to ground capacitive signal-leakage currents obtained through emitter-base and collector-base capacities of transistor Q3. This fact contributes to a high degree of isolation in the "off" state.

As already stated, the constant current generator's KS3 open-circuit voltage is obtained in the "off" state, and the constant current generator KS1 (as well as KS2) shall insure that the Schottky-diode is working in the forward direction. The generator may be a constant-current generator with a transistor of the known kind which, for example, is shown in the U.S. Pat. No. 3,303.413 and a closer description has subsequently not been considered as necessary. The constant-current generator KS3 shall exibit such a partially non-linear characteristic that it, with a load, provides a constant current and without a load provides a constant current. This may be obtained by a transistor circuit that is supplied with an appropriate voltage.

Thus, it is apparent that through the invention a switch is obtained, which is possible to produce in an integrated monolithic structure and which is characteristic for a low voltage drop in the "on" state and a very low current in the "off" state and which consequently is exceptionally well adapted to be used in an electronic cross-point array.

It is suitable that the constant-current generators KS1, KS2, KS3 as well as those transistors which are included in the control-logic are produced in the same monolithic substrate as the switch-transistors Q1 and Q2 and the Schottky-diodes D1 and D2.

We claim:

1. Improved cross-point array for telecommunication systems, produced as an xy-matrix in a monolithic substrate with switching means arranged at the cross-points between the x and y conductors in the form of transistors controllable to assume an "on" state with a low impedance and an "off" state with a high impedance, the transistors having their collector-emitter path connected between the x and y conductors and supplied with current from a constant-current generator and control means for switching the transistors between the "off" and "on" states, the improvement comprising that the collector-base diode of each of the transistors is connected in parallel with a Schottky-diode supplied with current from a second constant-current generator and operating in its forward direction in the "on" state, whereby cross-talk caused by a parasitic transistor function is inhibited between the cross-points in the substrate.

2. The cross-point array of claim 1 wherein the control means includes means for simultaneously switching two transistors between the "on" and "off" states.

3. A cross-point switch array for a telecommunication system comprising: a plurality of information-signal input terminals; a plurality of information signal output terminals; a monolithic substrate, a first plurality of row conductor means, a second plurality of column conductor means, means for connecting said information signal input terminals to the conductor means of one of said pluralities, means for connecting said information signal output-terminals to the conductor means of the other of said pluralities, said conductor means being arrayed on said monolithic substrate to form a matrix of crossing points, a switching element at each of said crossing points, each of said switching elements comprising a transistor and a diode on said monolithic substrate, said transistor having an emitter electrode, a collector electrode and a base terminal, said diode being connected across said base terminal and one of said electrodes, one of said electrodes of each transistor being connected to one of said row conductor means and the other of said electrodes of each transistor being connected to one of said column conductor means; first constant current generator means connected to the base terminals of said transistors; second constant current generator means connected to the conductor means of one of said pluralities; reference potential means connected to the conductor means of the other of said pluralities; and control means connected to the base terminals of said transistors for selectively changing the conductive states of said transistors.

4. The cross-point switch of claim 3 wherein each conductor means is a pair of conductors, each of said switching elements comprises two of said transistors, each connected to one of the conductors of the pair, and said control means simultaneously controls the two transistors of each switching element.

* * * * *